Jan. 24, 1967  H. R. HAY  3,299,589
APPARATUS FOR MODULATING THE TEMPERATURE WITHIN ENCLOSURES
Filed Aug. 16, 1965  6 Sheets-Sheet 2

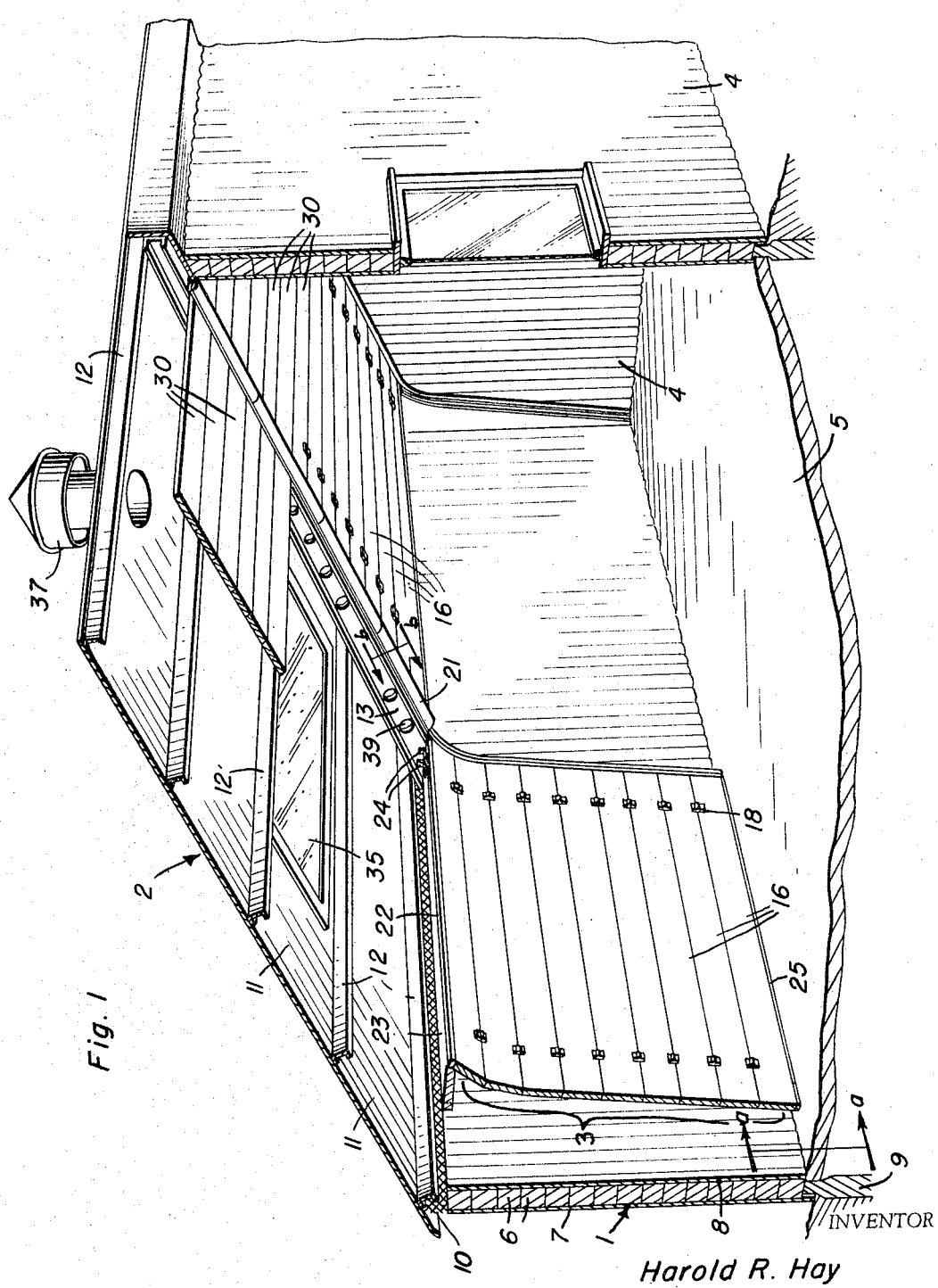

INVENTOR
Harold R. Hay
BY Parker & Philpitt
ATTORNEY

INVENTOR
Harold R. Hay

Jan. 24, 1967   H. R. HAY   3,299,589
APPARATUS FOR MODULATING THE TEMPERATURE WITHIN ENCLOSURES
Filed Aug. 16, 1965   6 Sheets-Sheet 4

INVENTOR
Harold R. Hay
BY Parker & Philpitt
ATTORNEY

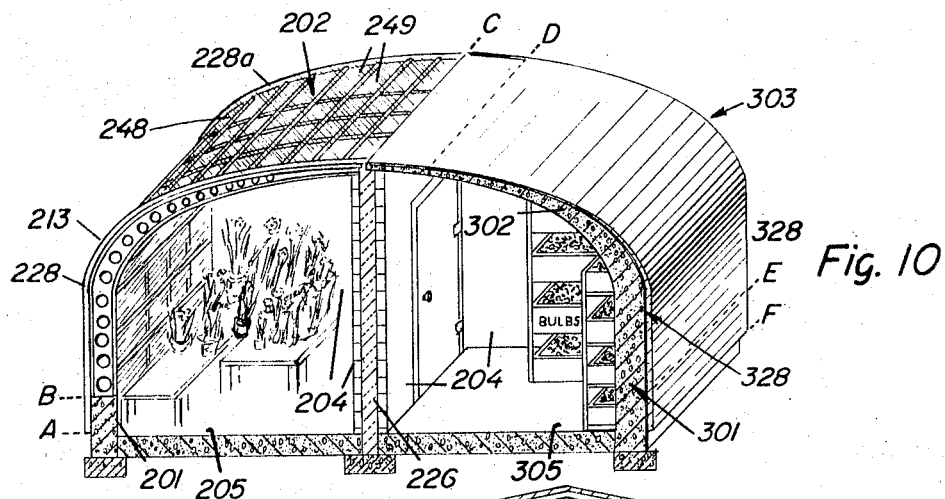
Fig. 10
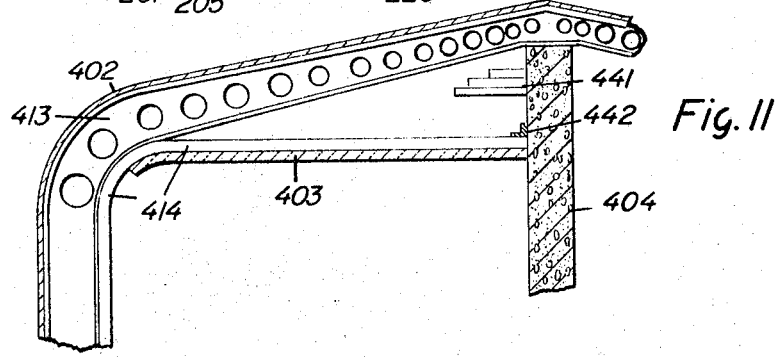
Fig. 11
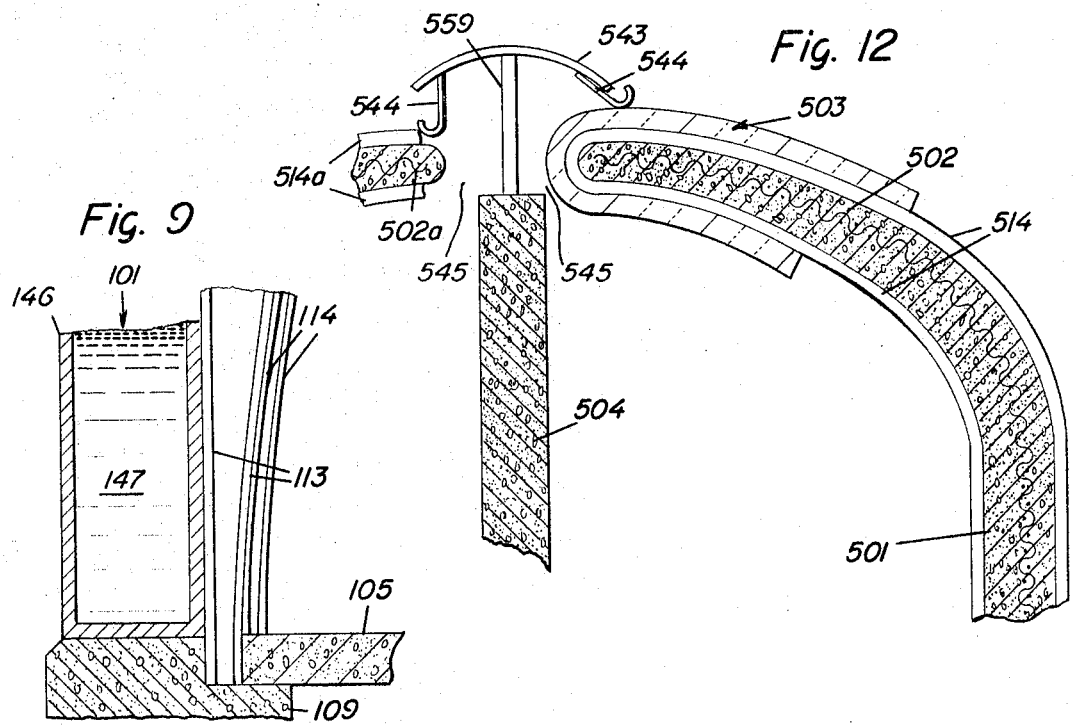
Fig. 9
Fig. 12

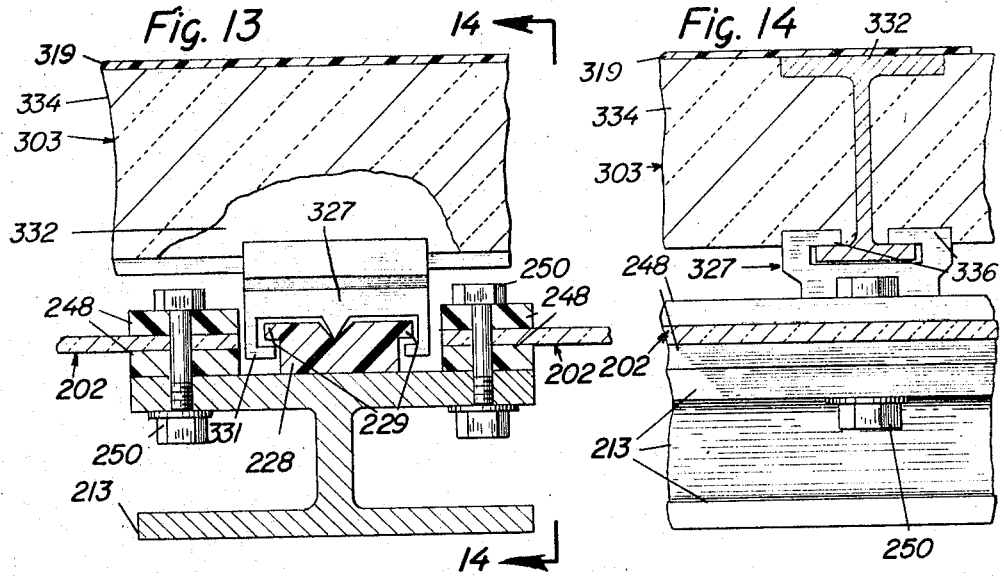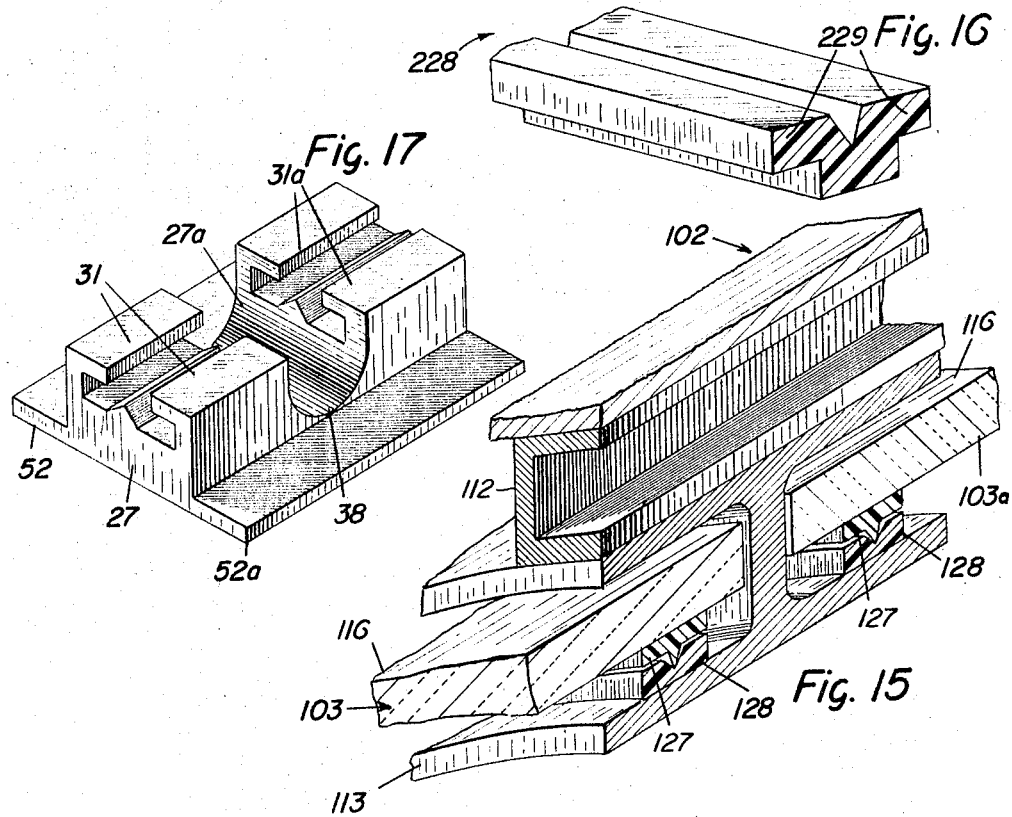

United States Patent Office

3,299,589
Patented Jan. 24, 1967

3,299,589
APPARATUS FOR MODULATING THE TEMPERATURE WITHIN ENCLOSURES
Harold R. Hay, 795 Roble, Menlo Park, Calif. 94025
Filed Aug. 16, 1965, Ser. No. 482,027
16 Claims. (Cl. 52—71)

This application is a continuation-in-part of my prior applications Serial No. 668,202, filed June 26, 1957, now abandoned, and Serial No. 163,381, filed December 19, 1961, now abandoned. This invention is subject to a reservation by the United States Government of a non-exclusive, irrevocable, and royalty-free license with power to grant licenses for all governmental purposes.

This invention generally relates to an apparatus for modulating the temperature within enclosures. More particularly this invention relates to a thermal valve means incorporated into an enclosure so that by simple manual or automatic manipulation of the thermal valve means the temperature within the enclosure as a whole or the temperature of various individual components or contents of the enclosure may be regulated to suit the objectives for which the enclosure is intended.

In one particular embodiment, this invention relates to a novel thermal valve means incorporated into a house and operated in such a manner as to maintain the internal temperature of the house as closely as possible to the most comfortable of the daily external temperatures, said novel thermal valve means consisting primarily of standard building components, the relative location of which within the enclosure may be varied at will and in consonance with external changes in the daily temperature.

In another embodiment, the thermal valve means forms part of a farm structure for the protection of animals. In yet another embodiment the thermal valve means modulates temperatures in a greenhouse and may simultaneously modulate temperatures in an adjacent building or room intended for the storage of vegetables. A similar thermal valve means may be incorporated into a solar still, as disclosed in a co-pending application, wherein it materially influences the rate of distillation of a distilland. Moreover, the thermal valve means may influence the evaporation of water from wet materials such as grain and lumber when they are confined within an enclosure designed as a solar drier of which the thermal valve means is a part. Said thermal valve means may further be adapted to solar water heaters so as to maintain desirable temperatures therein. It is irrelevant in what form of enclosure, or for what purpose, the temperature modulation is achieved by means of my invention.

Before proceeding with descriptions of these embodiments of the invention, attention is directed to certain fundamental propositions which will facilitate an understanding of the detailed description hereinafter made.

It has been historic and current practice to build houses and other building structures from components such as walls, ceilings, roofs and floors which remain permanently fixed in their positional relationship to one another. Thermal comfort within such structures has heretofore been maintained either by a combination of structural design with mechanical and electrical devices such as fans, heaters and air conditioners or through structural design alone. In hot and dry areas, thermal comfort in structures is obtained using walls 18 to 36 inches thick to maintain within the structure a temperature which approaches the average of the external daily variation. Massive walls of this type are costly and the average temperature obtained in this manner is not always as comfortable as the more comfortable of the two extremes. It often would be a distinct advantage to maintain internal structure temperatures nearer the external night temperature during the summer months and nearer the external day temperature during the winter months. Hitherto, structural materials used alone have not attained these objectives.

Today, in most areas of the world, one may compensate for the deficiencies of historic design of structures by adding fireplaces, electric heaters and air conditioners for temperature adjustment in the rooms and fans to increase air movement which lowers body temperature by increasing evaporation. However, these means of obtaining comfort are costly in initial investment, in continuing fuel or power requirements and in maintenance. They cannot be afforded, in some countries, by many families in the lower income levels nor can they be used economically where fuel and electric power are not readily available as in deserts, on mountain tops or in remote areas.

In modern times, many low density materials have been developed and applied by various means to building structures or other objects requiring insulation, thus obviating the use of massive construction. It has been characteristic of the application of this low density insulation that it is fixed in a definite and permanent relation to one or another of the components of the structure such as the side walls or the roof. I have found that there is not only a disadvantage in having said insulation affixed to said components during a part of the day, but that differing components can be either benefited or detrimentally affected by insulation at the same time during the day and that a movable thermal barrier of said insulation can be positioned alternately in differing locations so as to be useful in relation to components requiring insulation while avoiding effect upon components which at that particular time should be free from insulation in order to produce the optimum thermal characteristics within the building structure. I have found that when this movable thermal barrier is combined with building components of ancient or modern types to be described, and when these components of the building structure are oriented properly with respect to the seasonal path of the sun and when the movable thermal barrier is positioned in concordance with the daily path of the sun, a unique effect may be had upon the temperatures within the building structure.

In my invention it is usually characteristic that the movement of the thermal barrier means causes it to be importantly useful in its various possible positionings during portions of the day which are unlike by virtue of solar radiation or temperature. The effective thermal barrier may even act in different capacities during such unlike portions of the day or it may act in relation to different components of the structure and it generally serves a beneficial function in a thermal process in each of its possible positionings.

This invention is herein broadly related to devices for collecting solar energy, for its storage and for control over its dissipation in a manner to add to comfort or to the utility of mankind. While this invention is disclosed with particular reference to maintaining within a building structure temperatures comfortable to life or favorable for the preservation of foods and other products deleteriously affected by excessively high or low temperatures and while it is also disclosed with particular reference to the production of potable water from saline or brackish water, and it can be applied to the drying of grain or lumber, because of the particular utility in these fields as will hereinafter appear, it is expressly understood that the invention is not restricted thereto.

The primary object of this invention is to provide an improved device for controlling the collection and loss of solar energy characterized by low-cost production, operation and maintenance.

Another object of this invention is to provide an improved device for building structures for collecting and storing solar heat during winter months as a continuing source of heat during cold nights while also operating to minimize the effects of the collection and storage of heat during summer months.

Another object of this invention is to provide an improved device for controlling either the collection of solar heat or the prevention of heat loss from storage characterized by the capacity to maintain the temperature of the interior of the structure or of components of the structure or of materials or objects within the structure at the most optimum portion of the diurnal cycle of approximately one half of the day while modulating the temperature during the remainder of the day so as to prevent deleterious effects of adverse thermal conditions.

Another object of the invention is to provide improved natural lighting and improved acoustical conditions within the structure in which this invention is employed while simultaneously controlling the collection and loss of solar heat.

It is another object of this invention to provide comparatively simple and inexpensive means for modulating the temperature within an enclosure.

It is an added object of this invention to provide a measure of heat control within an enclosure by moving well-known building components into different positional relationships with respect to each other dependent upon the changes in the external temperature.

Another object of this invention is to provide a movable thermal valve means within a building structure which can be alternately moved into positional relationship with either the roof or the side wall of the building structure so as to thereby at least partially affect the rate at which heat either enters or leaves the building structure.

An additional object of this invention is to affect thermally sensitive objects and processes such as evaporation, distillation, heat storage or transfer, and all such processes as are influenced by thermal change within an enclosure. Other objects and advantages of the present invention will become more apparent after reading the following descriptions taken in conjunction with the drawings.

The invention is capable of receiving a variety of mechanical expressions illustrated on the accompanying drawings, but it is to be expressly understood that the drawings are for purposes of illustration only and are not to be construed as a definition of the limits of the invention, reference being had to the appended claims for that purpose. For clarity, the description relating to a building structure as illustrated in FIGURES 1 to 17 inclusive will be separated from the description relating to the control of temperatures or processes within specialized enclosures.

A. THERMAL MODULATION IN A BUILDING STRUCTURE

The following description of the invention relates to a building structure in which:

FIGURE 1 is a front cut-away perspective view of a building structure containing the novel apparatus according to this invention;

Figure 4:
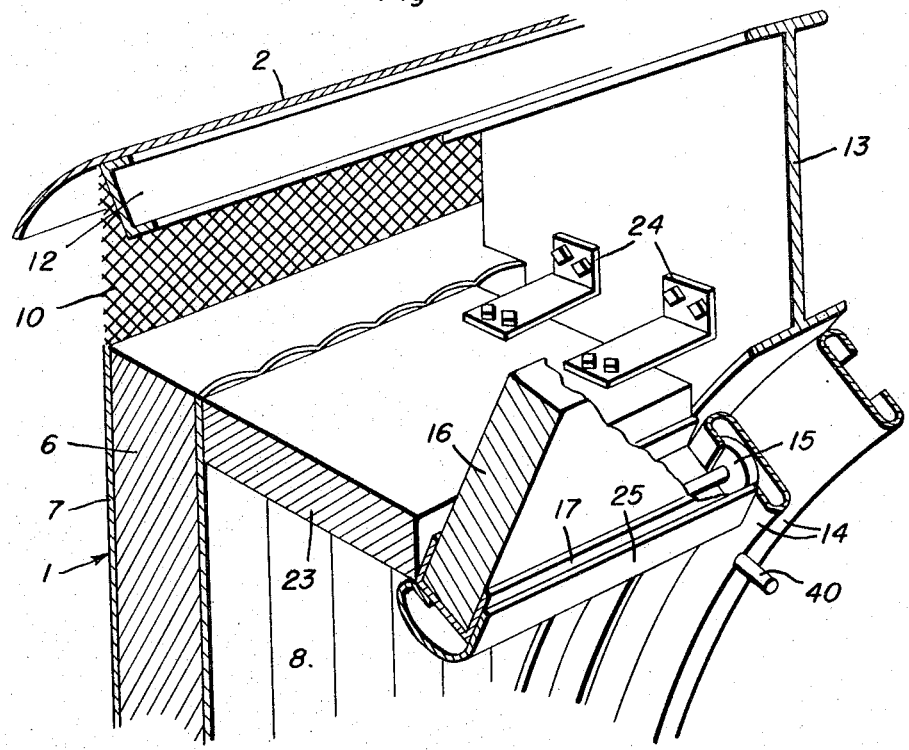
FIGURE 4 is another enlarged perspective view of the wall seal and insulation panel, when the panel is in its uppermost position.

FIGURE 9 is a diagrammatic sectional view of an embodiment in which the high heat capacity wall 101 is composed of a liquifiable material 147 confined within metal 146;

FIGURE 10 is a perspective sectional representation of another embodiment of the invention in which the enclosure is divided into compartments and in which the movable thermal barrier is moved externally from an effective area substantially covering the first compartment to an effective area substantially covering the second compartment;

FIGURE 11 is a fragmentary diagrammatic sectional view of a further embodiment of the invention in which the movable insulation 403 is positioned by means of a trackway located near the high thermal capacity wall or substantially parallel to the floor at a considerable distance from the roof portion 402;

FIGURE 12 is a fragmentary diagrammatic sectional view of still another embodiment of the invention in which the movable thermal barrier 503 can be positioned alternately on the exterior or the interior portion of the enclosure;

FIGURE 13 is a sectional and partially cut-away view showing one means, a knife-edge runner, for moving the movable thermal barrier, mounted externally on the enclosure;

FIGURE 14 is a sectional view of FIGURE 13 taken along line 14—14 of FIGURE 13;

FIGURE 15 is a diagramamtic sectional representation of a means for moving a plurality of the movable thermal barriers on the inside of a structure by means of knife-edge runners;

FIGURE 16 is a fragmentary sectional and perspective view of a grooved trackway suitable for use with a knife-edge runner as a means for moving the movable thermal barrier;

FIGURE 17 is a perspective view of a dual knife-edge runner of flexible material suitable, in combination with the grooved trackway of FIGURE 16, for moving the movable thermal barrier when connected thereto and also serving as a hinge for separate panels constituting said thermal barrier.

In its simplest form, as embodied in a building structure, this invention usually utilizes three separate and distinct building elements or components having quite different heat transfer characteristics. When these three different building elements are properly incorporated into the design of a building they form a thermal valve means which may be manipulated manually or automatically in relation to the time of day so as to maintain the temperature within the building as close as is possible to the more comfortable of the daily extremes of temperature. These three building elements or components are as follows:

(I) The high thermal capacity wall

In accordance with one embodiment of this invention, shown as the building structure in FIGURE 1, the building structure should have at least one substantially vertical wall 1 composed primarily of high thermal capacity material. Said wall should also have moderate thermal transfer characteristics and should preferably be oriented to obtain a southern exposure in the northern hemisphere and a northern exposure in the southern hemisphere. The high thermal capacity wall 1 may consist of brick, stone, adobe, rock, concrete, or other similar materials, or mixtures thereof. The interior and exterior faces of said wall may be finished with a comparatively thin layer of plaster, stucco, concrete, paint, etc., if desired to improve appearance or weather resistance. The interior and/or exterior faces may be sheathed with metal, plastic, thin plywood, hardboard or such other materials as do not substantially alter the thermal characteristics of said wall. In certain circumstances, one might use, instead of the above-described materials, a wall consisting of two opposed metal panels which confine between them either a fluid of high thermal capacity as shown in FIGURE 9 (such as water or solar heat collecting chemicals of the type of sodium sulfate decahydrate, sodium thiosulfate pentahydrate, etc.), or a loose particulate mass of high thermal capacity material (refractory dust, granules or powders).

It is preferred in the type of structure shown in FIGURE 1, that the high thermal capacity wall 1 should be of such thickness that it will provide about a twelve-hour heat lag in attaining maximum or minimum temperature by heat transfer from one face to another. Brick, stone, concrete or earth walls of approximately thirteen inches in thickness have been found generally to be most suitable, although a thickness range of as wide as between three and twenty inches may be satisfactory under varied conditions and in diverse localities.

Normally, the type of high thermal capacity wall described above would produce less comfort than a more costly thicker wall and this discomfort could ordinarily only be lessened by means of fireplaces, heaters, fans or air conditioners.

(II) *The roof*

In accordance with this invention as applied to the building structure shown in FIGURE 1, the building structure should have a roof 2 constructed of a material having little resistance to heat transfer and little thermal capacity. Thin sheets of either metal or glass are preferred, but in some instances roofing consisting of asbestos-cement, plastic or similar material so manufactured to have little resistance to heat transfer may be used. The roof 2 preferably should be low with relation to the floor so as to minimize the cubic volume of the room and should be sloping so as to expose the maximum amount of its surface to the southern exposure in the northern hemisphere or the maximum surface to northern exposure in the southern hemisphere. This type of roof has heretofore been considered undesirable for building structures because under normal circumstances it would produce uncomfortably warm internal temperatures during summer daytime hours and uncomfortably cool temperatures during winter nighttime hours.

(III) *Movable thermal barrier*

In accordance with the embodiment of FIGURE 1, a building structure should have what can aptly be generally referred to as a thermal valve 3 and which can be referred to more specifically as a movable thermal barrier 3. Said barrier is preferably composed of low density sheets, panels or blocks of fairly rigid or semi-rigid insulation having low heat capacity and low thermal transfer characteristics. The insulation material may be of the rigid type, such as the vegetable fiber product known by the trade name "Celotex," or it may be cork, balsa wood, foamed glass, foamed polystyrene. The insulation also may be of the semi-rigid type such as batts of wood fiber, mineral wool, glass wool, or the foamed products of rubber, polyurethane, or other plastic or resin materials.

Movable thermal barrier 3 likewise may be formed from non-rigid materials such as mineral wool, glass fiber or wood fiber loose-fill insulations held in flexible cloth, paper or other containers, or from aluminum foil, plastic sheets or other reflective insulation alone or in combination with other insulators. The insulating material may be of the non-rigid type confined within or bonded to a suitable material or in some foreign countries it may consist of woven grass, pithy materials or even plant seeds having cotton-like hairs. The combination of rigid and non-rigid insulating materials, some or all of which may be transparent or translucent, is likewise contemplated.

The above-described material in the movable thermal barrier 3 contrasts with the high thermal capacity wall 1 in that the thermal barrier has a much lower thermal capacity and lower heat transfer characteristics and it contrasts with the roof 2 in that the thermal barrier has a much lower rate of heat transfer. It is these distinguishing properties of the movable thermal barrier which allow it to function effectively as a thermal valve in the building structure embodiment of FIGURE 1.

For the structure shown in FIGURE 1, the movable thermal barrier 3 should be mounted inside the building structure in such a manner that it can be alternately positioned closely adjacent either the inside of high-density wall 1, which has a partially controlled thermal flow or in near proximity to roof 2, which has an essentially uncontrolled thermal flow. When the barrier 3 is so mounted it can act as a thermal valve, in the sense that it is able to control the flow of heat into and out of the building structure. The various ways in which the movable thermal barrier may be mounted so as to achieve these ends will be discussed more fully hereinafter.

(IV) *Other elements of the structure*

In accordance with this invention, as shown in FIGURE 1, the other three walls of the building structure may be constructed of the same material as the high thermal capacity wall 1 or of any other suitable material. High thermal capacity walls are preferred, but where considerations of economy, appearance, design, etc. make the use of such walls impractical or unfeasible, other types of walls having a lower density and a lower thermal capacity may be used as long as it is realized that the temperature cannot be controlled within the same desired limits as if high thermal capacity walls were employed.

The building structure may have a floor of any well-known type. The greater the insulation between the earth and the interior of the building structure, the smaller will be thermal flow to and from the earth and the heat storage in the earth. Poured concrete is preferred, although wooden flooring can also be used.

The above description of the various elements of my invention will be clearer after reading the following description taken in conjunction with the drawings:

FIGURE 1 is a cut-away perspective view of a building structure in accordance with this invention. This structure comprises a substantially vertical high thermal capacity wall 1 constructed of a plurality of stacked bricks or of concrete blocks 6. A roof 2 has its lower edge supported by the upper portion of wall 1 while the opposite end of roof 2 slopes upwardly and away from the top of said wall. A movable thermal barrier 3 is disposed within the building structure. Two other walls 4 are shown, which together with a fourth wall (not shown) and a floor 5 complete the building structure except for doors (not shown) and windows (partially shown).

Figure 2:
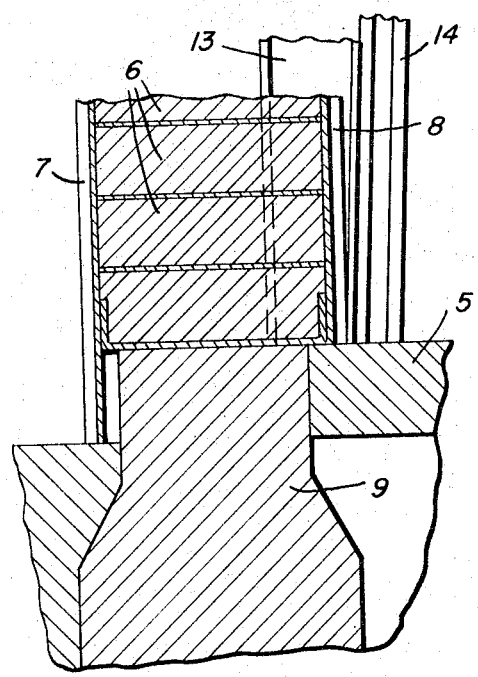
FIGURE 2 is an enlarged diagrammatic sectional view of the footing and lower side of the wall, taken along line a—a of FIGURE 1.

As shown, the high density wall 1 has outer and inner faces covered and protected by sheath material 7 and 8 which preferably consists of plaster or stucco, of tile, or of rather thin elongated sheets of metallic or plastic material joined to the high density wall by bolts, wires, screws, nails, cement, etc. The plurality of stacked blocks 6 is supported on any suitable type of foundation or footing 9 (see FIGURE 2).

Near the top of the high thermal capacity wall 1 suitable transverse support means in the form of purlins 12 bearing on I-beam frame 13 can be provided for the lower edge of roof 2. In the drawings, ventilation eave 10 has been shown which permits ventilation between the inside and outside of the building structure. The ventilation eave 10 has not been found to be a necessary component of the building structure but its use is recommended. A similar ventilation strip near the upper edge of roof 2 is also desirable and may be used in lieu of the roof ventilator 37.

In the illustrated embodiment, roof 2 consists of a plurality of overlapping metal sheets which are supported and fastened to a number of transverse roof members 12 which run lengthwise across the entire upper portion of the building structure. The roof supporting members 12 are shown as being supported by the upper edge of I-shaped beams 13. Beams 13 are firmly anchored at their lower extremities in a suitable foundation, preferably concrete. The number of I-shaped beams which are used in any given building structure will depend upon the size of the building structure and upon the size of each of the movable thermal barriers 3 to be used within the building structure. The lower or inner edge of I-shaped beam 13 is adapted to serve as a base or anchoring point for one or more trackways within which rollers attached to any desired portion of thermal barrier 3 are adapted to travel.

Figure 5:
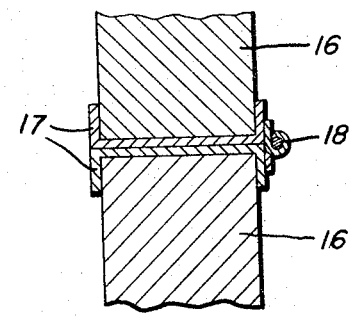
FIGURE 5 is an enlarged diagrammatic view of the hinge portion of the mounting for the insulation panel shown in FIGURE 1.

As shown, movable thermal barrier 3 consists of a plurality of elongated and essentially rigid string of lightweight insulation material or frames of supported non-rigid insulation material 16. The strips of insulation material 16 may be joined to form barrier 3 in a number of ways readily recognized by those skilled in the art. For instance, the individual insulating panels 16 may be joined by suitable receiving brackets 17 and piano type hinges 18 (see FIGURE 5) or panels 16 may be made to adhere to a continuous flexible backing of fabric or metallic material 19, as for instance sheet aluminum (see FIGURE 3) by use of an adhesive. Alternatively insulating panels 16 may have their faces joined to a continuous facing fabric or flexible metallic material and the backs of said insulating panels (i.e. that surface of the panel nearest the outside of the building structure) may be provided with non-continuous aluminum foil which serves a reflective insulation function.

Figure 6:
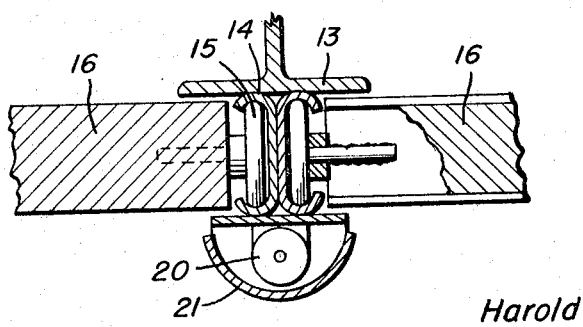
FIGURE 6 is an enlarged diagrammatic sectional view of the trackways and associated structure taken along line b—b of FIGURE 1.

As shown in FIGURE 6, the rollers 15 are preferably mounted directly in the end sections of insulating panels 16 by any suitable mounting means. Rollers 15 could just as well be mounted either on backing material 19 of FIG. 3 or on a portion of insulation supporting brackets 17 of FIGURE 5.

If so desired, lighting means may be arranged below trackway 14. This is best illustrated in FIGURES 1 and 6 by the numeral 20 representing a light source and numeral 21 representing a light shade or diffusor. Other lighting arrangements can of course be employed.

Figure 3:
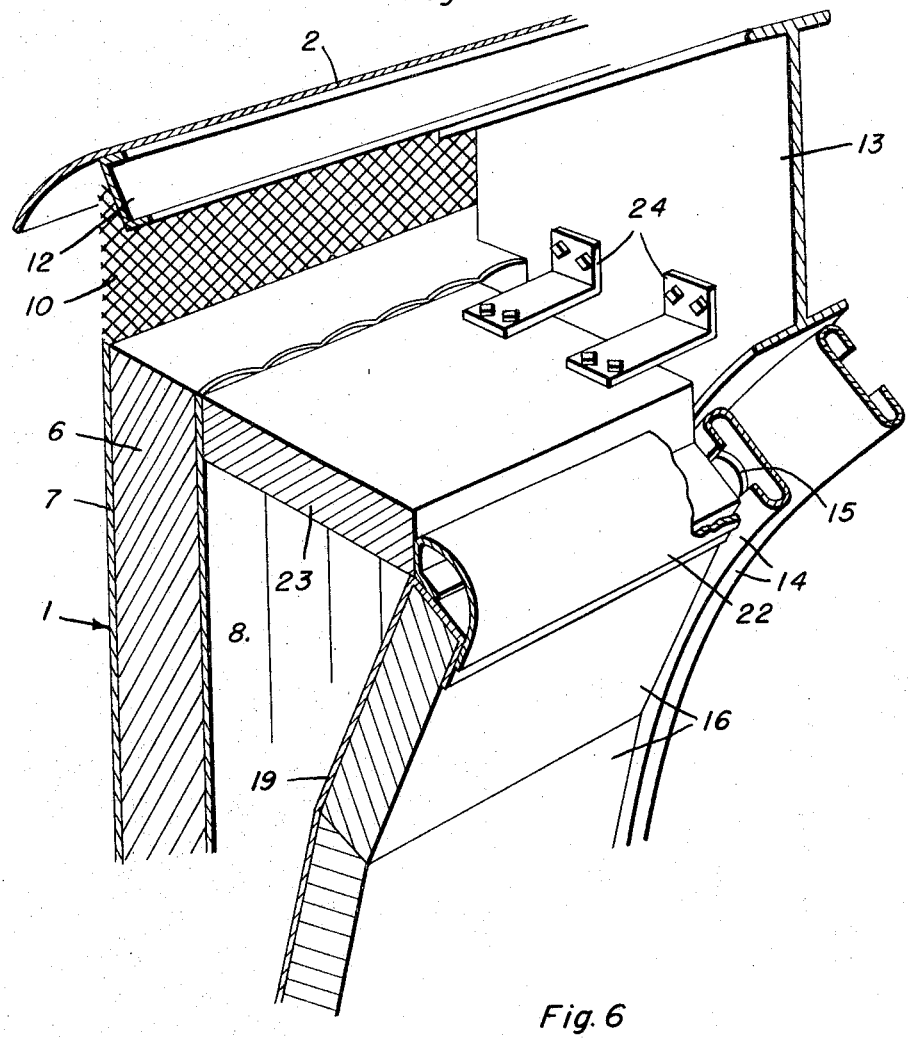
FIGURE 3 is an enlarged perspective view of the wall seal and insulation panel means of FIGURE 1.

The upper horizontal edge of the upper insulation panel 16 preferably contains a flexible sealing element 22 (as is best shown in FIGURE 3); the purpose of element 22 is to provide, in conjunction with stationary wall seal 23, an effective seal when movable thermal barrier 3 is in its lower position so that air contained between thermal barrier 3 and high thermal capacity wall 1 cannot move from this area into the interior of the building structure by convection or otherwise. Wall seal 23 is preferably permanently fixed at a position either near the top of wall 1 or near the lower portion of roof 2, and as best shown by FIGURE 3, wall seal 23 may be maintained in position by one or more brackets 24 attached to I-shaped beam 13 or to the walls. Seal 22 preferably consists of a flexible fold of plastic, leather, rubber, or similar material. More elaborate and equivalent sealing means will suggest themselves to those skilled in the art (e.g. foam rubber bumpers, etc.).

Referring now to FIGURE 4, a similar sealing means 25 is shown on the lower horizontal edge of the lowest panel member 16. When movable thermal barrier 3 is in its uppermost position and essentially parallel to the roof 2, the seal 25 in conjunction with permanent wall seal 23 serves to restrict movement of air between thermal barrier 3 and roof 2 into the interior of the building structure.

Referring again to FIGURE 1, it will be seen that the I-shaped beam 13 can be considered as dividing the building structure into right-hand and left-hand portions. Movable thermal barrier 3 shown on the left side of beam 13 is in its lowermost position. By examining the area to the left of I-shaped beam 13 near the point where the beam joins the upper portion of roof 2, it will be seen that there are a number of permanently positioned insulating panels 30 which extend across the building structure in a generally (but not necessarily) parallel relationship to the upper part of the roof 2. The purpose of fixed panels 30 is to form an extension of the thermal barrier between the roof and the interior of the building structure when the area of movable thermal barrier 3 is not great enough to adequately cover the entire roof area. The manner in which panel 30 and panel 16 cooperate to cover the entire roof area is best seen by observing the area to the right of beam 13. Of course, if the roof area is exactly the same as the area of the high thermal capacity wall, there would be no need for employing stationary panel members 30.

While panels 30 are shown in FIGURE 1 to be fixed, they may also be movable toward the wall opposite that indicated as wall 1 or panels 30 may be hinged independently but operated as a unit to change from a position approximately parallel to the roof (or floor) to a position approximately parallel to the walls, thus exposing the under portion of roof 2 in the area of panels 30.

FIGURE 1 shows that roof 2 may be constructed of more than one material. For example, the roof may contain in addition to the metallic sheets, one or more areas of glass or transparent or translucent materials such as plastics (e.g. skylights) 35 which permit sunshine to enter the interior of the building structure when movable thermal barrier 3 is in its lowermost position. Also the roof may contain one or more ventilating cowls 37 which permit ventilation of the entire building structure or merely of the closed-off area between the roof and the thermal barrier 3 when barrier 3 is in its uppermost position. Alternatively, a ventilation strip of the type 10 at the eaves may be located at the higher edge of the roof or louvres may be provided in the end walls between roof 2 and the position of fixed panels 30 or thermal barrier 3 in its uppermost position. It will further be noted that the I-shaped beam 13 of FIGURE 1 contains a number of circular holes 39 which in some instances have been found desirable to permit cross circulation of air when the movable thermal barriers are in their uppermost positions.

The movable thermal barrier 3 may be either manually or automatically raised and lowered. Said barrier may be maintained in any raised position by means of counterweights or by merely inserting a pin, lug or spike into a hole in a portion of trackway 15 so that the pin, lug or spike 40 (see FIGURE 4) obstructs the downward movement of roller 15 within trackway 14. Other equally suitable means for regulating the position of the movable thermal barrier will readily suggest themselves to those skilled in the art. Said thermal barrier 3 may be raised by either lifting the lowermost insulating panel of the thermal barrier or by pulling on a rope, cable or chain attached to the uppermost panel of the thermal barrier, said rope or chain preferably passing over appropriate pulley arrangements located near the top of the roof so as to minimize effort involved in raising the thermal barrier. Counterweights or spring arrangements and lockable sprockets or other fastening means may be suitably employed.

While the foregoing description has set forth one particular embodiment for carrying out the broad invention herein disclosed, it will be appreciated by those skilled in the art that numerous other and different ways can be devised for carrying out this same basic inventive concept. For example, the thermal barrier could consist of a single large rigid panel hingeably mounted near the junction of the high density wall and the roof. The thermal barrier would then merely swing between its lower position adjacent to the high thermal capacity wall and its upper position adjacent to the roof, the thermal barrier being fastened or otherwise attached to the roof members or to the wall by any suitable fastening means. It is apparent, however, that if the movable thermal barrier consists of a single rigid panel hinged at the juncture of the high thermal capacity wall and the roof, the raising and lowering of the panel would be cumbersome and would sweep much of the internal volume of the room, thereby interfering with the placement of the furniture in the room. This objection could be reduced by utilizing two or three panels hinged so as to fold against one another during the lowering process, but this also is somewhat cumbersome. It is therefore preferred that the movable thermal barrier consists of a plurality of subdivided insulating members which can be readily moved along curved or angled paths.

Also, one might employ an entirely different means for moving the thermal barrier from one position to another. For example, one might use a thermal barrier having ball bearing mountings, or a sprocket and chain arrangement or an arrangement involving a plurality of gears or pulleys, etc.

In summertime, the method of using the thermal valve means to obtain internal temperature modulation involves positioning movable thermal barrier 3 near roof 2 during the daytime and adjacent high thermal capacity wall 1 during the nighttime. In this manner, the heat from the sun which penetrates the roof during the daytime will be blocked by the movable thermal barrier from entering the room. Also, during the day the sun's heat will start penetrating high thermal capacity wall 1 but owing to the twelve hour lag preferably provided in the wall, this heat will not reach an excessive temperature at the interior surface of the wall until after sunset. At this time the movable thermal barrier is lowered and the insulating properties of the thermal barrier prevent heat stored in the high heat capacity wall from passing into the room at night, thereby avoiding an undesirable temperature in the room. Simultaneously, the lowering of the movable thermal barrier from the overhead position adjacent the roof permits heat radiation from the room through the roof to the cold night sky. Thus the heat of day is excluded from the room while the interior of the room is allowed to cool to night temperatures through internal convection and without the necessity of opening doors, ventilators and windows as is usually practiced with only partial effectiveness if house design, orientation or external wind velocity are not optimum.

The flow of heat stored in the high thermal capacity wall during daytime is blocked by the presence of the movable thermal barrier at night and is caused to reverse its direction and to dissipate heat to the night sky by radiation. During daytime the interior surface of this wall will then be cool, exposed and able to absorb from the room a good portion of the heat leakage through doors and windows since the movable thermal barrier has then been removed from the wall and is positioned near the roof.

During wintertime, the method of obtaining optimum thermal modulation by means of the movable thermal barrier consists of reversing the relative position of the movable thermal barrier as compared to its position in the summer. Thus during the day the movable thermal barrier would be positioned against the high thermal capacity wall so that heat in the room is not absorbed into this high thermal capacity wall which has cooled off during the night. Simultaneously, the roof which is exposed to the sun rapidly heats during the day and radiates this solar heat into the room thereby raising the temperature to or nearer the optimum comfort range. At night the movable thermal barrier is raised thereby preventing heat loss from the room through the roof and simultaneously the stored solar heat acting with a twelve-hour heat lag through the high thermal capacity wall enters the room maintaining comfortably warm temperatures throughout the night despite heat loss through leakage at the doors, ventilators and windows.

Figure 7:
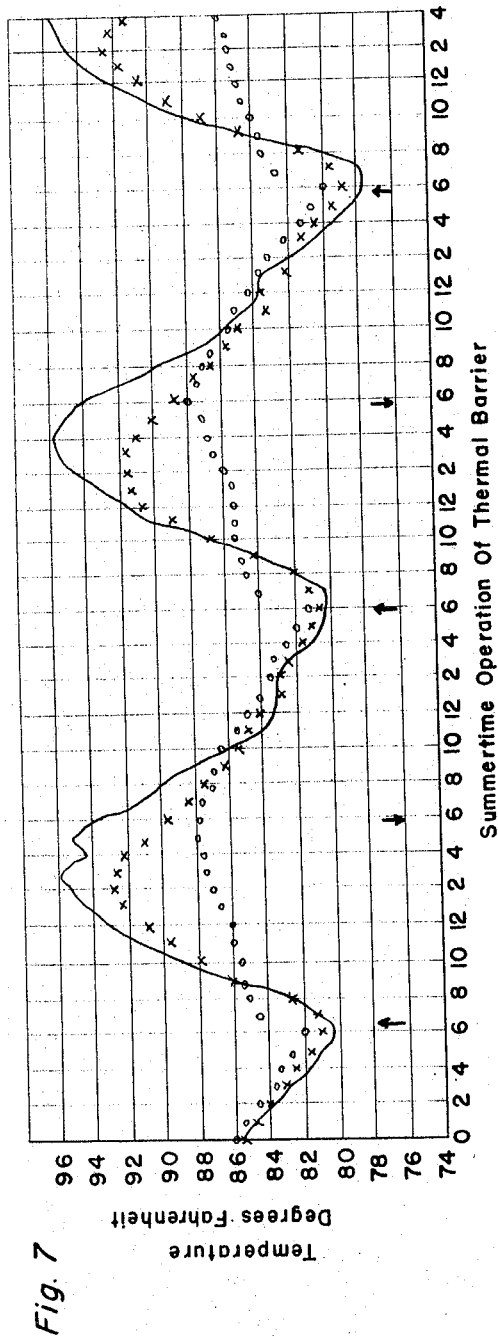
FIGURES 7 and 8 are temperature variation charts.
Figure 8:
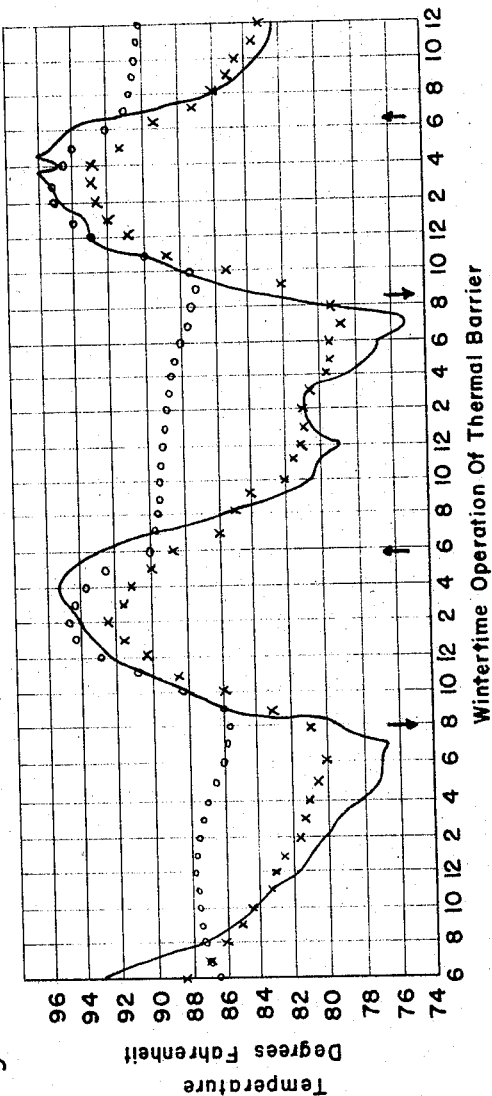

FIGURES 7 and 8 are presented to illustrate the great degree of temperature control achieved by employing the novel thermal valve means of this invention in conjunction with a high thermal capacity wall and other elements of the building structure. FIGURE 7 graphically illustrates the striking temperature variations achieved during summertime operation of the movable thermal barrier while FIGURE 8 graphically illustrates the temperature control achieved during wintertime operation when using the movable thermal barrier. The solid lines in these graphs represent the official Weather Bureau shade temperature at a distance of approximately five miles from the experimental house. The curve defined by $x$'s represents the observed temperature in an adjacent room not provided with a movable thermal barrier, the adjacent room being used as a control. The curves defined by a series of small circles represent the observed temperature in the room of a building structure provided with a movable thermal barrier.

Referring to FIGURE 7, it will be seen that the Weather Bureau shade temperature, the temperature in an adjacent room and the temperature in the room provided with a movable thermal barier are all approximately the same at about 6 a.m. Between about 6 a.m. and 10 a.m. the temperautre in the room provided with a movable thermal barrier operated under the conditions indicated, rises somewhat above the other two temperatures, but at about 10 a.m. the temperature in the room provided with the movable thermal barrier begins to level off and does not exceed a maximum of about 88° while the other two temperatures continuously increase to a maximum of between 92° and 96° at about 2 to 4 p.m. as a result of the uncontrolled effects of the sun. After about 4 p.m. the Weather Bureau temperature and the temperature in the adjacent room begin to drop and at about 10 p.m. the three temperatures approximate each other again and then drop together until about 6 a.m. the next day. It is thus seen that by proper placement of the movable thermal barrier one is able to lower the peak interior temperature during the day so that the average temperature within a room is considerably below the temperature which would exist in the room if there were no movable thermal barrier. It is apparent that the peak with the thermal barrier is approximately one-half that of the outdoor temperature in this example where a 16 to 18 degree diurnal variation was recorded. In cases where a 40 degree variation is common, the benefit of comparably reducing the peak temperautre is of much greater value.

Referring now to FIGURE 8 which illustrates wintertime operation in accordance with this invention, the movable thermal barrier is raised between the hours of about 6 p.m. and 8 a.m. While the movable thermal barrier is in the raised position it prevents loss of the heat from the interior of the building structure through the roof and permits the heat stored in the high thermal capacity walls to flow into the room. Therefore between the hours of 6 p.m. and about 8 a.m. the temperature within a room provided with a thermal barrier will be much higher than either the Weather Bureau shade temperature or the temperature in an adjacent room not provided with a thermal barrier. Between the hours of about 8 a.m. and 6 p.m. the movable thermal barrier is in its lowered position and while in this position it permits solar heat to flow into the building structure through the roof while at the same time it prevents loss of heat from the room into the night-cooled high thermal capacity wall. By using a movable thermal barrier and a high thermal capacity wall one is thereby able to maintain the temperature within a building structure during the wintertime at a level considerably above that which would otherwise be possible if no thermal barrier means were used.

The results shown in FIGURES 7 and 8 were obtained in successive weeks during the month of September when the day and night temperature differential was minimal in the area. A much more pronounced effect would be shown in results when the winter range is 30 to 70° F. and the summer range is 70° to 110° F.

In mentioning the foregoing examples of materials from which the thermal barrier, the high thermal capacity wall and the roof may be constructed, it is not the intent to limit the invention to these materials or forms. Other materials known to the art which will yield essentially the same effect as the disclosed materials are also to be considered as within the purview of this invention.

Likewise, many minor design details are contemplated, such as (a) interposing a grill of metal, plastic, wood or other material between the view of a person in the room and the movable thermal barrier so as to improve the aesthetic appearance of the room; (b) providing either or both manual or electrical means for changing the position of the movable thermal barrier, including possible use of automatic controls regulated by external temperature or light intensity; (c) providing windows in the roof so that during winter, light will enter the room when the thermal barrier is positioned adjacent the wall but will be excluded during the summer when the intense glare would be objectionable, since at that time the thermal barrier is near the roof; (d) by the provision of one or more fixed or adjustable ventilators between the roof and the thermal valve in position near the roof; or (e) by special treatment of the surfaces of the wall, the roof or the panel so as to alter the reflectivity or diffusivity of the materials contained therein. Similarly it is anticipated that this invention can be used with equal or greater effectiveness with walls of metal, plastic or other materials which can retain water or other liquids of high heat capacity and which may be stored or pumped to other walls, to heating or cooling systems embedded in floors or the like. The principles of the invention may also be embodied in combination with other solar heat devices, such as solar heat collectors of the liquid or air circulation type and the thermal barrier may even serve to replace a part of a solar heat collector as for example in the chemical type calling for a curtain or closing screen to be interposed between the thermal collector and the solar heat source but this invention would be an improvement over the previously described curtain or closing screen in that it has greater insulating characteristics and acts favorably not only with respect to the heat collector but also with respect to the heat transfer in the high heat capacity wall—a dual benefit not heretofore conceived.

Because the material of the movable thermal barrier and the means for moving it are important aspects of this invention, it is desirable to describe another thermal barrier means which constitutes an alternate to the rigid panels mounted with rollers and trackway as illustrated in FIGURES 1 through 6. As shown in FIGURES 10, 13 and 14, movable thermal barrier 303 may consist of flexible polyurethane 334 fastened by means of adhesives to a more weather resistant, flexible backing strip material 319 (which corresponds to 19 of FIGURE 3) and having a plurality of horizontal stiffening I-shaped members 332 attached to said backing strip 319 which transfer the weight of said thermal barrier 303 onto a knife-edge runner 327 a portion of which 336 engages said I-shaped member while the knife-edge portion is mounted to engage in a grooved trackway 228 suitably mounted on the I-section arched rigid frame 213 of FIGURE 10 which is a part of the enclosure of this invention.

Stiffening members 332, of FIGURES 13 and 14, may be made of aluminum; knife-edge runner 327 may be made of Delrin; grooved trackway 228 may be formed from nylon resin fastened by any suitable adhesive to arched frame 213 which may be made of steel, aluminum, wood or other appropriate material. FIGURE 13 shows grooved trackway 228 formed with projections 229 partially surrounded by lip member 331 formed as a part of knife-edge runner 327. An enlarged view of continuous grooved trackway 228 with projections 229 is shown in FIGURE 16.

FIGURE 17 shows a dual knife-edge runner 27 and 27a having a shape substantially as in FIGURES 13 and 14 except for the portion to be attached to the movable thermal barrier. In FIGURE 17, side projections 52 and 52a provide a wide base for fastening the knife-edge runners 27 and 27a to panels of insulation, such as panels 16 of FIGURE 1, at points suitably oriented on said panels to transfer their weight onto structural member 13 of the enclosure. The two knife-edge runners 27 and 27a of FIGURE 17 are interconnected by a thin, flexible section 38, of the same plastic from which said runners are formed, which can serve as a hinge when 27 and 27a are fastened to separate but abutting panels 16 of FIGURE 1. The lip projections 31 and 31a of FIGURE 17 are designed to engage projections 229 of the trackway shown in FIGURE 16 so that knife-edge runners 27 and 27a do not become disengaged from said grooved trackway when the latter is mounted onto a vertical portion of a frame member such as 213 of FIGURE 13.

It is apparent that the knife-edge runner of FIGURE 17 could be extended from the dual form illustrated to include any number of knife-edge runners of the type of 27 separated by one less flexible hinge of the type of 38. It is equally obvious that parallel rows of these knife-edge runners could be made with projection 52a shared in common by said parallel rows and thus integrated into a single unit comprising a plurality of rows of individual knife-edge runners of the type of 27 and 27a.

The advantages to this invention of the use of knife-edge runners of the type described above and of continuous, movable thermal barriers also described above are the following: The continuous insulation eliminates the need for forming and mounting a plurality of panels and hinges such as 16 and 18 of FIGURE 5, also shown in FIGURE 1. Likewise, the cost, installation and maintenance expense of the more elaborate trackway and roller moving means of FIGURES 1 to 6 are eliminated and the problems of lubrication and squeaks are reduced. It is precisely to minimize friction and noise that the grooved trackway and knife-edge runner are made of nylon resin and Delrin respectively. Additionally, the movable thermal barrier may now be formed so that the flexible polyurethane 334 constitutes its own sealing means thereby eliminating the need of sealing elements 22 and 25, such as are used in FIGURES 1 to 6.

It is obvious that the knife-edge runners may have to be variously mounted on the structural framing of the enclosure in different embodiments of this invention. FIGURE 15 shows the details for mounting two thermal barrier means 103 and 103a on a common frame element 113 of the enclosure made by roof 102 supported by purlin 112 fastened to structural frame element 113 to form a structure of the type of FIGURE 1. In FIGURE 15, panels 116 bear on knife-edge runners 127 which transfer the load to grooved trackway 128 supported by said structural member 113. The movable thermal barrier 303 of FIGURES 13 and 14 has been previously described and is supported by structural member 213 so as to be outside of the enclosure made in part by roof 202 which is composed of transparent material such as glass or suitable plastic affixed to said structural member 213 by bolts 250 which effect a sealing pressure on the plastic or fibrous roof-framing material 248. The exterior mounting of the movable thermal barrier illustrated in FIGURE 13 and 14 can suitably be used for an embodiment of this invention shown in FIGURE 10 which will be described in greater detail.

While this invention has been described primarily for a structure of the type shown in FIGURE 1, it is apparent that the movable thermal barrier, if made of weather-resistant materials or suitably protected from the weather, may be made positionable against the ouside of the high thermal capacity wall and the roof of a building structure and may be of such size as to cover both simultaneously. FIGURE 10 illustrates this embodiment of the invention in the form of a greenhouse comprising a hot-house portion to the left for growing plants and a cold-storage portion to the right for the storage of seeds or bulbs and for retarding the growth of plants kept therein until periods of greater demand.

In this embodiment, thermal barrier 303 has been shifted from a southerly exposed room or compartment in the northern hemisphere over a ridge at position marked C to the northerly side of the building. During the winter day the southerly side is heated through roof 202 which comprises high heat transfer materials of transparent types also forming a substantial portion of the south wall. During this period floor 205 and the other walls 204 in addition to the high heat storage south wall 201 absorb and store heat and consequently said floor, other walls and south wall all may be considered as high heat storage portions of the enclosure and therefore may be considered in common as the high heat storage component of this embodiment of the invention These elements absorb heat from both direct external solar radiation and indirect internal radiation from the roof and wall. At night, in this embodiment, the thermal barrier is moved from the northerly side of the building structure to the external southerly portion and is disposed to insulate both the wall and the roof of the southerly side. This not only has the advantage, previously described in relation to a building structure comprising an entirely southerly exposed roof as in FIGURE 1, of preventing heat loss through the southerly exposed roof during the nighttime, but it also has the added advantage of retaining within the newly defined building structure all the solar heat stored in the southerly exposed high thermal capacity wall 201 during the day and directs radiation from said wall inwardly during the night. In contrast, the earlier described embodiment permits radiation of a portion of the stored heat to be directed both inwardly to the room and outwardly to the night sky.

By dividing the building structure into a plurality of rooms or compartments, as illustrated in FIGURE 10, the novel features of this invention produce opposite thermal effects in the rooms or compartments southerly exposed and those northerly disposed. Thus, while in wintertime the temperature within the southerly exposed room is being raised during the daytime and held at an elevated temperature by internal radiation from the high thermal capacity wall during nighttime, the northerly disposed rooms are prevented by the thermal barrier from increasing in temperature during daytime and are cooled to night temperature during nighttime. This provision of dual thermal control provides comfort in the southerly exposed rooms for living things and prevents damage to materials or goods deleteriously affected by low temperatures while it provides low temperatures corresponding to cold storage conditions in the northerly disposed rooms. Similarly in the summertime the dual thermal control may be used to lower the temperatures in the southerly exposed room while maintaining an elevated temperature in the northerly disposed rooms, this elevated temperature being desirable in some building structures for the drying of seeds, fruits, and the like or for forcing faster growth of plants in a greenhouse structure, or for the fermentation of fodder in a farm structure or for other purposes.

It is also apparent that the movable thermal barrier of the embodiment illustrated in FIGURE 10 may, under other circumstances, create desirable temperature conditions within the building structure by being positioned part of the day so as to insulate all or a portion of the southerly exposed roof or all or a portion of the northerly disposed roof while leaving another portion of the external walls uninsulated. This is clear from FIGURE 10 where the length of movable thermal barrier 303 is defined as the area between points D–F and leaves an area of roof 302 exposed between limiting points C and D. If, however, the C–D area of said roof should be covered by the thermal barrier, a corresponding section of high heat storage wall 301 will be exposed (as indicated for example between points E and F). Similarly, if D–F equals C–B on the structure and the insulation is positioned to cover the roof area 202 between points C–B, the wall portion 201 between points B–A will be exposed, but if the same thermal barrier is moved down to A, a portion of the roof 202 near the ridge at C will be left exposed. In this manner it is possible to obtain controlled temperatures within the compartments ranging substantially from the maximum to the minimum of the daily diurnal variation.

In the embodiment of FIGURE 10, the common wall of the two compartments includes an insulating material 226 to reduce thermal flow between the compartments. The roof 302, walls 304, floor 305 and wall 301 all become the high heat storage portion of this compartment in which the movable thermal barrier is positioned by means of a knife-edge runner assembly indicated generally by 328. Knife-edge runner assembly 328 comprises a knife-edge runner fastened to said thermal barrier by means illustrated in FIGURES 13 and 14, and a trackway such as that illustrated in FIGURE 16 which in FIGURE 10 is shown as being fastened by suitable means directly to the concrete roof and wall portions 302 and 301 respectively. The trackway of knife-edge assembly 328 continues over the ridge C and onto the structural frame member 213 where it is indicated as 228 and a corresponding trackway at the end of the structure is indicated as 228a. The roof framing material 248 of roof 202 may be made of plastic, wood or metal and the transparent portions 249 of the roof may be of plastic, such as Teflon, Tedlar, Aclar, Kel-F and Mylar, or it may be of glass.

An alternative arrangement (not shown) with rooms of similar size and shape disposed side by side with identical orientation, permits insulation covering both the sides and the roof of one room to be laterally shifted on rollers bearing on a foundation common to both rooms so that the insulation covers, during a different portion of the day, the second room.

In another embodiment illustrated in FIGURE 11, which shows only a portion of the upper part of a building structure, this invention encompasses the use of a movable thermal barrier 403 positioned during a portion of the day substantially parallel to the floor (not shown) and at a considerable angle to and distance from a roof 402 supported by framing member 413. In this instance, trackway 414 on which the movable thermal barrier is mounted in a manner comparable to that of FIGURES 1 to 6 is parallel to the high heat storage wall 401 until it approaches roof 402 whereupon it becomes parallel to the floor (not shown) and is fastened at 442 to the other wall 404. When the thermal barrier is used as illustrated in FIGURE 11, it is apparent that a considerable distance may exist between the major portion of thermal barrier 403 and the major portion of roof 402. The space between said roof and said thermal barrier (when disposed parallel to the floor) has a tendency to build up high temperatures during a summer day. While the high temperatures are useful in greenhouses, grain or lumber driers and in solar stills as will be described in section B, the effect is not desirable in houses since it results in excessive heat storage in the portion of wall 404 extending upwards from the level of thermal barrier 403 when said barrier is positioned parallel to the floor. Consequently, it is advisable to have louvres 441, or other means (such as are shown in FIGURE 1), which will reduce the build-up of heat in this enclosed area. The usefulness of this embodiment of the invention which positions the movable insulation 403 substantially parallel to the floor and at an appreciable distance from the roof is evident from the data of FIGURES 7 and 8 which were obtained in a house built according to this embodiment.

In another embodiment illustrated in FIGURE 12, movable insulation 503 is mounted by any suitable means heretofore described to move on trackway 514 which is continuous over exterior wall 501 and roof 502, passes through aperture 545 in said roof and continues along the interior surface of said roof and said wall in a manner which permits movable thermal barrier 503 to be positioned inside of or outside of the enclosure substantially formed by said roof and said wall. A ridge-roll 543 and a suitable hinged sealing device 544 is supported adjacent aperture 545 by support 559 mounted at the upper ends of wall 504.

It is apparent that in the embodiment illustrated by FIGURE 12, the insulation may be positioned totally within the structure during the day in which case the exposed wall 501 and roof 502 become heated and much of this stored heat can be caused to radiate into the room when the movable thermal barrier is put into a nighttime position exterior to said roof and said wall. Instead of thus warming this portion of the enclosure, it is possible to cool it by the same thermal barrier means by merely reversing the daytime and nighttime positioning of said thermal barrier.

In an additional embodiment of the invention which can be made sufficiently clear to those versed in the art by FIGURE 12, one can arrange a switching device, similar to those used in railroad tracks, above wall 504 so as to interconnect the trackways both internal and external on the portion of the structure to the right of said wall 504 with trackways 514a shown broken attached to roof 502a to the left of wall 504. By means of such switching mechanism it is possible to cause movable thermal barrier 503 to pass through aperture 545 to a position either on the interior or on the exterior side of roof 502a and other possible components of a compartment to the left of wall 504, such as a high heat capacity wall (not shown), and thereby provide a means for controlling the temperatures in the two compartments partially indicated to the left and to the right of wall 504 of FIGURE 12. In another embodiment not shown, the aperture through which the movable insulation passes could be located at the eaves by removing eave ventilator 10 shown in FIGURES 1, 3 and 4. At this location of the aperture, the movable insulation might be caused to take various positional relationships with the wall 1 and the roof 2 of FIGURE 1. With suitable trackway systems and apertures at both the eaves and the ridge the number of positionings greatly increases as does the degree of control of the temperature within the enclosure or within different compartments of the enclosure.

While it is preferable that, in the embodiment of FIGURE 1, the roof of the building structure shall be of thin material of rapid thermal transfer, in other circumstances the roof may be of thick concrete construction, as indicated by 502 of FIGURE 12 or of varying thickness as indicated by 302 of FIGURE 10 and also the roof, of any type, may be integrated with all or a portion of the side wall and indistinguishable therefrom as in FIGURES 10 and 12. Likewise the high heat capacity material may be a material liquifiable below 160° F. such as water 147 of FIGURE 9, or the heat collecting chemicals previously mentioned, and it will hereinafter be disclosed in detail how it also can be water or other distilland or distillate in a distillation process. Moreover, it may be water contained within grain or lumber which is being dried in a solar drier.

It will now be evident that the movable thermal barrier of this invention does not need to be co-extensive with any particular element of the structure nor does it need to be located close to any porticular element, and neither does it have to be positioned so as to make heat flow through a first portion of the enclosure independent of heat flow through a second portion of the structure where said first and second portions do not include the thermal barrier means. The criterion for the movable thermal barrier means of this invention is that it shall be effective in controlling or modulating the temperature within an enclosure partially comprising material of high heat storage capacity.

It is also evident that while the movable thermal barrier is preferably of low density with low heat capacity and low heat transfer, said barrier could be effective if made of high heat capacity and high thermal storage materials such as thick metal, concrete, confined water, and the like having a suitable time lag for heat transfer similar to the construction of wall 1 of FIGURE 1. Movement of such a high heat capacity thermal barrier has obvious limitations in a building structure and costs would be high. These limitations do not apply, however, when the high heat capacity thermal barrier is distilled or distillate in a movable basin floating within a solar still as in embodiments of my co-pending application. The essential consideration of this invention is that a thermal barrier of whatever type forming a part of an enclosure be moved in consonance with the daily diurnal variation of temperature and modulate, in a novel manner, the temperature which would otherwise exist within said enclosure.

B. THERMAL MODULATION OF PROCESS TEMPERATURES

The modulation of temperatures within enclosures inevitably affects many thermally sensitive objects and processes which may be operating within said enclosures. Temperature modulation in a house has a desirable effect upon inhabitants through affecting their physiological processes. This results even though the enclosure may not always be intact—at times doors and windows may be open. In the case of a greenhouse, and in the cold storage of vegetables, fruits, bulbs, and the like, this invention was applied in Part A to modulate temperatures specifically affecting physiological processes such as growth, blooming, and rotting. In all such cases involving life within the enclosures of Part A of this application, thermal modulation has an effect upon the heating and evaporation of water constituting a part of that life. My invention can, in other ways, modulate temperatures within enclosures so as to affect processes of evaporation, distillation and drying. Moreover, I can apply my invention to the heating and cooling of water for household or industrial uses. Such applications will now be described.

A solar still may be constructed in which at least one of my movable thermal barriers is in the form of a distillate basin which floats on and laterally moves over a reservoir of distilland confined by concrete side walls of the still and a plastic bottom liner the major portion of which rests on the ground. At least one rigid stationary brine tray made of plastic, metal or asbestos cement supported by side walls is suspended across the width of the still. Distilland introduced into said stationary tray through a conduit through the side wall overflows through a second conduit and falls into the underlying brine basin and is discharged from said underlying basin and from the solar still through a third conduit and a valve and piping means. Distillate which condenses on the plastic film cover, which may be of any type transmitting solar radiation, is collected in peripheral troughs or in troughs suspended from the cover by means of a recess and spline adapted to clamp a portion of said cover. The collected distillate is conducted to a conduit connected through flexible tubing to a distillate reservoir which may be within the floating thermal barrier basin which may be variously positioned by means of a drawline cord connected to said movable basin and passing out through the two ends of the solar still. The distillate conduit is also connected to a piping and valve means for removing distillate from the solar still.

The cover support is suspended across the width of the still on columns located beyond the edges of the still where said cover is clamped to the side walls; the cover is similarly clamped at the ends to form an enclosure. Materials of this embodiment are well known to those practicing the art and are fully described in my co-pending application.

In this embodiment, to be described with distillate in the movable basin, the daytime position of the movable thermal barrier basin is beneath the stationary brine tray and extends slightly beyond the bottom edges thereof by virtue of greater width of the movable basin. Brine over the bottom liner, which must resist actinic rays and high temperatures, is then exposed to solar radiation but distills somewhat slower than brine similarly exposed in the stationary tray owing to the necessity to indirectly heat brine underlying the movable basin by conduction and convection.

At sunset, the movable basin is positioned mostly outside the area underlying the stationary tray and in the new position distillate which entered it during the day through troughs, conduit and tubing is cooled to the night sky. Brine in the basin made by the bottom liner then continues to distill at night and vapors condense on the sloping underside of the stationary tray giving up latent heat thereto and causing further distillation of brine therein. Condensate on the underside of the stationary tray drips from bottom edges into the wider movable distillate basin except at one end of the still where a special collecting trough is provided to conduct distillate to the conduit connected with the movable distillate basin.

In the morning, brine contained above the bottom liner, as well as that in the stationary tray will be warmer than distilland in basins of prior art in which movable insulation is not used and said brine in the present embodiment will start distilling earlier. The cold distillate can then be withdrawn from the movable basin through tubing and a conduit or it may be left in the movable basin to serve as an internal condensing surface. If it is not desired to cool the distillate, nor to use it as a condenser, the movable thermal barrier need not be formed as a basin but can be a flat sheet of water-impervious insulating material such as expanded polystyrene in which case the distillate conduit and tubing passing distillate to the previously described movable distillate basin are not needed but the special collecting troughs are required at each bottom edge of the stationary trays.

In the foregoing embodiment of my invention, a movable thermal barrier within the meaning of this invention was used within a solar still to effect distillation by modulating the temperature of distilland and distillate. However, these processes are understood to be distinct from simple thermal control within a building structure. Clearly, the invention is equally applicable for modulating the temperature of water not involved in a distillation process. In the embodiment now to be described it is used to modulate the temperature of water in a water supply system.

Solar water heaters of various designs are in use in fairly large numbers in the United States and in other countries. All designs involve a relatively large black collector which receives solar radiation to heat water and which is faced toward the equator. A separate well-insulated storage tank has been used in prior art for overnight storage and is frequently placed at a higher level to take advantage of the thermosiphon principle of natural circulation brought about by less dense hot water rising through a conduit from the heater to the higher-level storage tank and replacement by colder water from said storage tank.

In regions of high solar intensity where solar water heaters are advantageous, the natural temperature of a surface water supply may be at the average of day and night temperatures, or higher, and not be as refreshing for drinking purposes as water at or near the lowest night temperature. Ice or refrigeration is not always available for cooling the drinking water and in such areas I apply my invention in the following manner.

The hot water heater of this embodiment is in the form of two rectangular tanks made of galvanized iron, copper, or aluminum fastened to the southerly sloping portion of a roof of a house or similar structure in the northern hemisphere. Both tanks are fastened to roof members by bolts, screws, or nails passing through tabs or projecting portions on the tanks. Insulation encloses all sides of the tanks except the upper surface inclined to absorb solar radiation; this upper surface is painted dull black or chemically coated by electroplating a black deposit thereon. A pipe conducts cold water into the lower portion of the lower tank; a plurality of tubes interconnect the two tanks and reduce any tendency for water passing from the lower tank to the upper tank before it has been heated; and another pipe which allows hot water to be withdrawn from the upper portion of the upper tank. If the tanks are not to be kept constantly under the usual pressure of a water supply system, the hot water pipe in the upper tank must be at a somewhat lower level and said tank must be vented at its highest level.

Solar radiation during the daytime will heat water in both heating tanks but as hot water is drawn off from the upper tank it will be replaced by the hottest water present in the lower tank rising through the interconnecting conduits.

At one side of the two water heating tanks, I fasten two cold water tanks constructed almost identical to the water heaters described above. Cold water is withdrawn from a pipe leaving the bottom of the lower tank and is replaced by water from the upper tank passing through the interconnecting plurality of tubes. Warm water enters the upper tank through an inlet near the top of said upper tank. A vent may be provided if the water cooling tanks are not to be under the pressures normal to urban water systems.

Across the upper ends of the upper hot and cold water tanks and across the lower ends of the lower hot and cold water tanks, I mount and fasten a trackway similar to the trackways of FIGURES 3 and 6 or of FIGURES 13 to 16 inclusive. A sheet of thermal insulation, preferably expanded polystyrene covered with reflective aluminum sheet, is mounted to said trackway and is moved in a manner similar to the movement of the movable thermal barriers described in Part A of this application. The area of the external movable thermal barrier of this embodiment is essentially equal to the combined upper surface of the pair of water heating tanks or of the pair of equal-size water cooling tanks.

During the daytime, I maintain the movable insulation over the water cooling tanks to protect said tanks from solar radiation while exposing the upper surface of the water heating tanks thereto. At sunset, I move the insulation to a position over the water heating tanks to prevent said tanks from radiating heat to the night sky while simultaneously exposing the upper surface of the water cooling tanks to the cooling effect of the night sky. In this manner, hot water may be drawn from the water heating tanks at any time of the day and cold water may similarly be drawn from the water cooling tanks within the capacity limitations of said tanks. To obtain the hottest and coldest water, the heating and cooling tanks should not have a depth of much more than four inches.

My invention may be applied to the heating and cooling of water in a cylindrically shaped storage tank formed from two adjacent metal semi-cylindrical tanks separated by a layer of insulation but joined by bolts and painted black on the curved exterior surfaces. The half cylinder oriented toward the north in the northern hemisphere is for water cooling and has the necessary pipe connections while that oriented toward the south, and also having the necessary pipe connections, is for heating water. Movable insulation of adequate size and shape to externally cover one of the semi-cylindrical tanks is mounted to a trackway running around the assembly of the two semi-cylindrical tanks at the upper and lower ends thereof. In a manner previously made clear herein, the movable insulation may be easily positioned around the northerly exposed surface of the water cooling tank during the daytime and around the southerly exposed surface of the water heating tank during the nighttime. Such positioning of the movable insulation provides means to obtain hot and cold water throughout the day and night.

Lumber driers are being developed by the United States Forest Products Laboratory to utilize solar energy. A black metal absorber and fans actuated by electricity or by wind are used to circulate hot air to dry lumber covered by a low-cost plastic film. Grain, fruit, and tobacco driers have also been built to utilize solar energy. In all cases, there is considerable heat loss at nighttime which may be avoided by using movable insulation to modulate temperatures within the driers. Such insulation may be formed from reflective materials in the shape of a solar radiation concentrator which, during the daytime, reflects radiation onto the product being dried or onto a collector which may be of the high thermal capacity type. The movable insulation may be positioned at nighttime to prevent radiation of heat to the night sky either from the product being dried or from the high thermal capacity collector and the heat so saved may be used to continue drying the product during the nighttime.

Thus the advantages of the present invention of movable thermal barriers are many and cannot all be related here. It is in common with all, or nearly all, of the embodiments of this invention that the movable thermal barriers effective for controlling the temperatures within the enclosures are utilized and effectively modulate temperatures within the enclosures when in different positional relationships with respect to various portions of the enclosure during different portions of the heat cycle and are frequently serving somewhat different or additional functions in the different positionings though it is not essential that the movable insulation performs in all of these manners in order to fall within the scope of this invention.

While the embodiments of the invention illustrated in the FIGURES 1 through 17 have been described with considerable particularity and other embodiments have also been generally referred to, it is expressly understood that the invention is not restricted thereto, as the essence of the disclosed invention is capable of receiving a variety of expressions which will readily suggest themselves to those skilled in the art. Obviously, changes may be made in the arrangement, proportion and composition of parts and certain features may be used with other features without departing from the spirit of this invention. I do not wish, therefore, to be limited to the precise details of construction set forth but desire to avail myself of all changes within the scope of the appended claims.

What is claimed is:
1. An enclosure having:
 (a) an exterior surface enclosing at least one compartment;
 (b) a first portion of said enclosure being constructed at least partially of material having high thermal storage characteristics;
 (c) a second portion of said enclosure being constructed at least partially of material having low thermal storage and high heat transfer characteristics;
 (d) a movable thermal barrier means adjacent to said enclosure;
 (e) means interconnecting said thermal barrier means to said enclosure for alternately moving said thermal barrier means from a first position close to said first portion to a second position more directly influencing heat transfer through said second portion without substantially changing the surface area of said movable thermal barrier means, wherein heat flow through said first and second portions is controlled by the positioning of the thermal barrier means.

2. The enclosure of claim 1 wherein said movable thermal barrier means is primarily constructed of a relatively thick, low density, low thermal storage, and low thermal conducting material.

3. The enclosure of claim 1 wherein said movable thermal barrier means is constructed of expanded plastic resin.

4. The enclosure of claim 1 wherein said movable thermal barrier is partially a high heat storage material and partially a low heat storage material.

5. The enclosure of claim 4 wherein said high heat storage portion of said movable thermal barrier is water.

6. The enclosure of claim 1 wherein the first portion of high thermal storage characteristics is at least partially a liquid at atmospheric pressure.

7. The enclosure of claim 6 wherein said liquid is water.

8. The enclosure of claim 1 in which at least one of the plurality of portions of high thermal storage characteristics is a liquid.

9. A plurality of enclosures of the type set forth in claim 1 in which the thermal barrier means is operatively associatable with at least two of said plurality of enclosures and has alternative positions adjacent to two of said plurality of enclosures with means interconnecting said thermal barrier means to said plurality of enclosures for alternately moving said thermal barrier means from a position close to a first enclosure to a position close to second enclosure wherein temperature in said first and second enclosures is controlled by the positioning of the thermal barrier means.

10. An enclosure having a plurality of compartments in which the exterior surface partially enclosing one compartment in a first portion constructed primarily of material having high thermal storage characteristics, the exterior surface partially enclosing another compartment is a second portion primarily constructed of material having low thermal storage and relatively rapid heat transfer characteristics, and wherein a movable thermal barrier means is connected to said first and second portions by means capable of alternately positioning externally said thermal barrier means over said first and second portions wherein heat flow through said portions is controlled.

11. An enclosure having:
 (a) an exterior surface,
 (b) a first portion of said enclosure being constructed of material having high thermal storage characteristics,
 (c) a second portion of said enclosure being constructed of material having low thermal storage and high heat transfer characteristics,
 (d) a movable thermal barrier means having an effective surface area substantially equal to the interior area of said first portion and being constructed of material having lower heat transfer characteristics than said second portion and having lower thermal storage characteristics than said first portion,
 (e) means interconnecting said thermal barrier to said enclosure for alternately moving said thermal barrier means from a first position close to said first portion to a second position close to said second portion, wherein heat flow through said first and second portions is made independent of one another and is controlled by the positioning of the thermal barrier means.

12. An enclosure according to claim 11 wherein there are provided at least two said first portions and at least two said second portions, and at least one thermal barrier means with means for moving said thermal barrier means.

13. A building structure comprising:
 (a) a wall portion constructed of material having high thermal storage characteristics,
 (b) a roof portion connected to said wall portion and being constructed of material having much lower thermal storage characteristics and much higher heat transfer characteristics than the material in said wall portion, (c) a movable thermal barrier means having an effective surface area substantially equal to the interior area of said wall portion and being constructed of material having lower heat transfer characteristics than said roof portion and lower thermal storage characteristics than said wall portion, (d) means interconnecting said thermal barrier to said building structure for alternately moving said thermal barrier from a first position close to said wall portion to a second position close to said roof portion, wherein heat flow through said wall or roof portions is made independent of one another and is controlled by the positioning of the thermal barrier means.

14. A building structure according to claim 13 wherein there are provided at least two of said wall portions, at least two of said roof portions and at least one thermal barrier means with means for moving said thermal barrier means.

15. A building structure according to claim 13 wherein said wall portion comprises at least in part materials of high thermal storage characteristics which are liquifiable at temperatures below 160° F.

16. An enclosure having:
(a) an exterior surface enclosing at least one compartment,
(b) a first portion of said enclosure having high thermal storage characteristics,
(c) a second portion of said enclosure having high thermal storage characteristics and spaced from said first portion,
(d) a third portion intermediate said first and second portions and spanning the space between said first and second portions, said third portion having high heat transfer characteristics and low heat storage characteristics,
(e) a movable thermal barrier means adjacent to said enclosure, and
(f) means interconnecting said thermal barrier means to said enclosure for alternately moving said thermal barrier means from a first position close to said first portion to a second position adjacent at least one of said second and third portions without substantially changing the surface area of said movable thermal barrier means, wherein heat flow through said first, second and third portions can be controlled by the positioning of the thermal barrier means.

References Cited by the Examiner
UNITED STATES PATENTS

| | | | |
|---|---|---|---|
| 466,831 | 1/1892 | Palmer | 160—120 |
| 1,225,118 | 5/1917 | Evans | 203—10 |
| 2,031,157 | 2/1936 | Gilson | 160—120 |
| 2,595,905 | 5/1952 | Telkes | 52—168 X |
| 2,639,551 | 5/1953 | McKee | 52—750 X |
| 2,975,873 | 3/1961 | Beliveau et al. | 52—64 |
| 3,060,521 | 10/1962 | Greco | 52—65 |
| 3,091,056 | 5/1963 | LaPorte | 52—65 X |
| 3,129,145 | 4/1964 | Hassler | 203—10 |

FRANK L. ABBOTT, *Primary Examiner.*

A. C. PERHAM, *Assistant Examiner.*